(12) United States Patent
Osipychev et al.

(10) Patent No.: US 12,482,367 B2
(45) Date of Patent: Nov. 25, 2025

(54) REINFORCEMENT LEARNING-BASED MID-AIR COLLISION AVOIDANCE

(71) Applicant: The Boeing Company, Chicago, IL (US)

(72) Inventors: Denis Osipychev, Huntsville, AL (US); Dragos D. Margineantu, Tukwila, WA (US)

(73) Assignee: The Boeing Company, Arlington, VA (US)

( * ) Notice: Subject to any disclaimer, the term of this patent is extended or adjusted under 35 U.S.C. 154(b) by 471 days.

(21) Appl. No.: 17/649,883

(22) Filed: Feb. 3, 2022

(65) Prior Publication Data

US 2023/0245575 A1    Aug. 3, 2023

(51) Int. Cl.
*G08G 5/00* (2025.01)
*G08G 5/30* (2025.01)
*G08G 5/55* (2025.01)
*G08G 5/59* (2025.01)
*G08G 5/80* (2025.01)

(52) U.S. Cl.
CPC ............... *G08G 5/80* (2025.01); *G08G 5/30* (2025.01); *G08G 5/55* (2025.01); *G08G 5/59* (2025.01)

(58) Field of Classification Search
CPC .. G08G 5/0008; G08G 5/0013; G08G 5/0021; G08G 5/003; G08G 5/0052; G08G 5/006; G08G 5/0078; G08G 5/045
See application file for complete search history.

(56) References Cited

U.S. PATENT DOCUMENTS

| 4,926,171 A | * | 5/1990 | Kelley | ............... G01S 13/933 340/961 |
| 2002/0116239 A1 | * | 8/2002 | Reinsma | ......... G06Q 10/06314 705/7.17 |
| 2007/0055434 A1 | * | 3/2007 | Kohlmann | ........ B64D 45/0034 701/100 |

(Continued)

OTHER PUBLICATIONS

Brockman, G. et al. OpenAI Gym. OpenAI, Jun. 5, 2016, 4 pages. <arXiv: 1606.01540v1>.

(Continued)

*Primary Examiner* — Matthew J. Reda
(74) *Attorney, Agent, or Firm* — Alleman Hall & Tuttle LLP

(57) ABSTRACT

A method is provided for avoiding a conflict during a flight of an aircraft that includes a defined route of travel. The method includes receiving observations of states of the aircraft and a nearby obstacle in an environment of the aircraft as the aircraft travels the defined route. The method includes applying the states to a reinforcement learning framework to predict states of the aircraft to avoid a conflict between the aircraft and the nearby obstacle. The reinforcement learning framework determines maneuvers of the aircraft to avoid the conflict, using a policy trained using a surrogate model of the environment in which movements of the aircraft and the nearby obstacle are simulated, and determines the predicted states of the aircraft from the maneuvers. A collision avoidance trajectory is generated from the predicted states of the aircraft, and output for guidance, navigation or control of the aircraft.

20 Claims, 8 Drawing Sheets

(56) References Cited

U.S. PATENT DOCUMENTS

| | | | | |
|---|---|---|---|---|
| 2009/0027253 | A1* | 1/2009 | van Tooren | G08G 5/006 342/29 |
| 2011/0213513 | A1* | 9/2011 | Naderhirn | G08G 5/74 701/3 |
| 2012/0209457 | A1* | 8/2012 | Bushnell | G08G 5/0078 701/4 |
| 2014/0136110 | A1* | 5/2014 | Nykl | G08G 5/0008 702/3 |
| 2016/0125746 | A1* | 5/2016 | Kunzi | G01S 7/003 701/11 |
| 2020/0312163 | A1* | 10/2020 | Dürr | G08G 5/0069 |
| 2021/0124353 | A1* | 4/2021 | Dally | G06N 3/08 |
| 2021/0142776 | A1* | 5/2021 | Sadhwani | H04N 7/181 |
| 2022/0003863 | A1* | 1/2022 | Habib | B64C 1/1415 |
| 2022/0143819 | A1* | 5/2022 | Tan | G06N 3/006 |
| 2022/0197312 | A1* | 6/2022 | Vemprala | G06N 3/047 |
| 2023/0028792 | A1* | 1/2023 | Cocaud | G08G 5/0039 |
| 2023/0239037 | A1* | 7/2023 | Zhang | H04B 7/18504 455/431 |

OTHER PUBLICATIONS

Cheng, R. et al. Control Regularization for Reduced Variance Reinforcement Learning. Proceedings of the 36th International Conference on Machine Learning, Long Beach, California, 2019, 10 pages.

Kaushik, M. et al. Overtaking Maneuvers in Simulated Highway Driving using Deep Reinforcement Learning. 2018 IEEE International Vehicles Symposium (IV), Changshu, Suzhou, China, Jun. 26-30, 2018, pp. 1885-1890. <DOI: 10.1109/IVS.2018.8500718>.

Mysore, S. et al. Regularizing Action Policies for Smooth Control with Reinforcement Learning. Department of Computer Science, Boston University, Boston, MA, co-affiliated with MIT-IBM Watson AI Lab, May 26, 2021, 7 pages. <arXiv: 2012.06644v2>.

Osipychev, D. et al. Human Intention-Based Collision Avoidance for Autonomous Cars. 2017 American Control Conference Sheraton Seattle Hotel, Seattle, WA, May 24-26, 2017, pp. 2974-2979. <DOI: 10.23919/ACC.2017.7963403>.

Quigley, M. et al. ROS: an open-source Robot Operating System. International Conference on Robotics and Automation, 2009, 6 pages.

Raffin, A. et al. Stable-Business3: Reliable Reinforcement Learning Implementations. Journals of Machine Learning Research 22, 2021, pp. 1-8.

Schulman, J. et al. Proximal Policy Optimization Algorithms. OpenAI, Aug. 28, 2017, pp. 1-12. <arXiv: 1707.06347v2>.

Notice for Unmanned Aircraft Operations in the National Airspace System (NAS). U.S. Department of Transportation, Federal Aviation Administration, Air Traffic Organization Policy. Effective date Nov. 25, 2015, cancellation date Nov. 24, 2016, pp. 1-18.

Sutton, R. & Barto, A. Reinforcement Learning: An Introduction. The MIT Press, Cambridge, Massachusetts and London, England, second edition, 2018, 2020, Part II: Approximate Solution Methods, 9.1 Value-function Approximation, 13.5 Actor-Critic Methods. 166 pages.

* cited by examiner

714 — CONVERT THE COORDINATES TO CORRESPONDING COORDINATES IN A LOCAL COORDINATE SYSTEM

FIG. 7B

716 — CONVERT THE COORDINATES TO CORRESPONDING COORDINATES IN A GLOBAL GEOGRAPHIC COORDINATE SYSTEM

FIG. 7C

REINFORCEMENT LEARNING-BASED MID-AIR COLLISION AVOIDANCE

FEDERALLY SPONSORED RESEARCH OR DEVELOPMENT

This invention was made with Government support under FA8750-18-C-0093 awarded by Defense Advanced Research Projects Agency. The government has certain rights in this invention.

TECHNOLOGICAL FIELD

The present disclosure relates generally to robotics and, in particular, to one or more of the design, construction, operation or use of autonomous robots such as autonomous or semi-autonomous aircraft.

BACKGROUND

Many modern robots and other machines are designed to operate with increased autonomy. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics and in particular UAVs is in the automated avoidance of mid-air collisions, which becomes even more important as the number of UAVs grows in number, weight and complexity. In order to guarantee safe operation in a shared airspace, it is desirable for UAVs to include detect and avoid (DAA) capabilities to detect and avoid hazards in planning and execution of phases of flight, and to remain well clear of hazards by at least an appropriate separation distance.

To prevent mid-air collisions, aircraft may be required to maintain a minimum safe distance by providing a vertical or horizontal separation. The most common way to resolve potential collisions in the air, the vertical separation of the aircraft, assigns different flight levels. This approach may be ineffective in cases of air traffic congestion, the low energy level of the aircraft, or due to extended reaction time. The horizontal separation is generally provided through guidance from the air traffic control (ATC) or by the set of rules prescribing certain behavior based on the type or position of the aircraft.

It would therefore be desirable to have a system and method that takes into account at least some of the issues discussed above, as well as other possible issues.

BRIEF SUMMARY

Example implementations of the present disclosure are directed to avoiding a conflict during a flight of an aircraft that includes a defined route of travel. Some example implementations focus on horizontal separation between an aircraft and a nearby obstacle such as another aircraft, and presents the collision avoidance problem as a two-dimensional (2D) surrogate optimization task. The surrogate is designed to be more conservative to guarantee the feasibility of the solution to the true task.

Example implementations use a reinforcement learning (RL) framework that enables optimization of a collision avoidance policy, and modelling the dynamics, interactions, and decision-making. A resulting policy and surrogate transitions may then be iteratively evaluated to translate an avoidance solution into a complete avoidance trajectory as a set of waypoints for the aircraft to follow. The avoidance solution may be designed to provide a quick and feasible avoidance trajectory that satisfies appropriate safety requirements.

The present disclosure thus includes, without limitation, the following example implementations.

Some example implementations provide an apparatus for avoiding a conflict during a flight of an aircraft that includes a defined route of travel, the apparatus comprising: a memory configured to store computer-readable program code; and processing circuitry configured to access the memory, and execute the computer-readable program code to cause the apparatus to at least: receive observations of states of the aircraft and a nearby obstacle in an environment of the aircraft as the aircraft travels the defined route; apply the states to a reinforcement learning framework to predict and thereby determine predicted states of the aircraft to avoid a conflict between the aircraft and the nearby obstacle, the reinforcement learning framework caused to: determine maneuvers of the aircraft to avoid the conflict, using a policy trained using a surrogate model of the environment in which movements of the aircraft and the nearby obstacle are simulated; and determine the predicted states of the aircraft from the maneuvers; generate a collision avoidance trajectory from the predicted states of the aircraft; and output an indication of the collision avoidance trajectory for use in at least one of guidance, navigation or control of the aircraft.

Some example implementations provide a method of avoiding a conflict during a flight of an aircraft that includes a defined route of travel, the method comprising: receiving observations of states of the aircraft and a nearby obstacle in an environment of the aircraft as the aircraft travels the defined route; applying the states to a reinforcement learning framework to predict and thereby determine predicted states of the aircraft to avoid a conflict between the aircraft and the nearby obstacle, the reinforcement learning framework: determining maneuvers of the aircraft to avoid the conflict, using a policy trained using a surrogate model of the environment in which movements of the aircraft and the nearby obstacle are simulated; and determining the predicted states of the aircraft from the maneuvers; generating a collision avoidance trajectory from the predicted states of the aircraft; and outputting an indication of the collision avoidance trajectory for use in at least one of guidance, navigation or control of the aircraft.

Some example implementations provide a computer-readable storage medium for avoiding a conflict during a flight of an aircraft that includes a defined route of travel, the computer-readable storage medium being non-transitory and having computer-readable program code stored therein that, in response to execution by processing circuitry, causes an apparatus to at least: receive observations of states of the aircraft and a nearby obstacle in an environment of the aircraft as the aircraft travels the defined route; apply the states to a reinforcement learning framework to predict and thereby determine predicted states of the aircraft to avoid a conflict between the aircraft and the nearby obstacle, the reinforcement learning framework caused to: determine maneuvers of the aircraft to avoid the conflict, using a policy trained using a surrogate model of the environment in which movements of the aircraft and the nearby obstacle are simulated; and determine the predicted states of the aircraft from the maneuvers; generate a collision avoidance trajectory from the predicted states of the aircraft; and output an indication of the collision avoidance trajectory for use in at least one of guidance, navigation or control of the aircraft.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 7A, 7B and 7C are flowcharts illustrating various steps in a method of avoiding a conflict during a flight of an aircraft that includes a defined route of travel, according to various example implementations.

DETAILED DESCRIPTION

Figure 1:
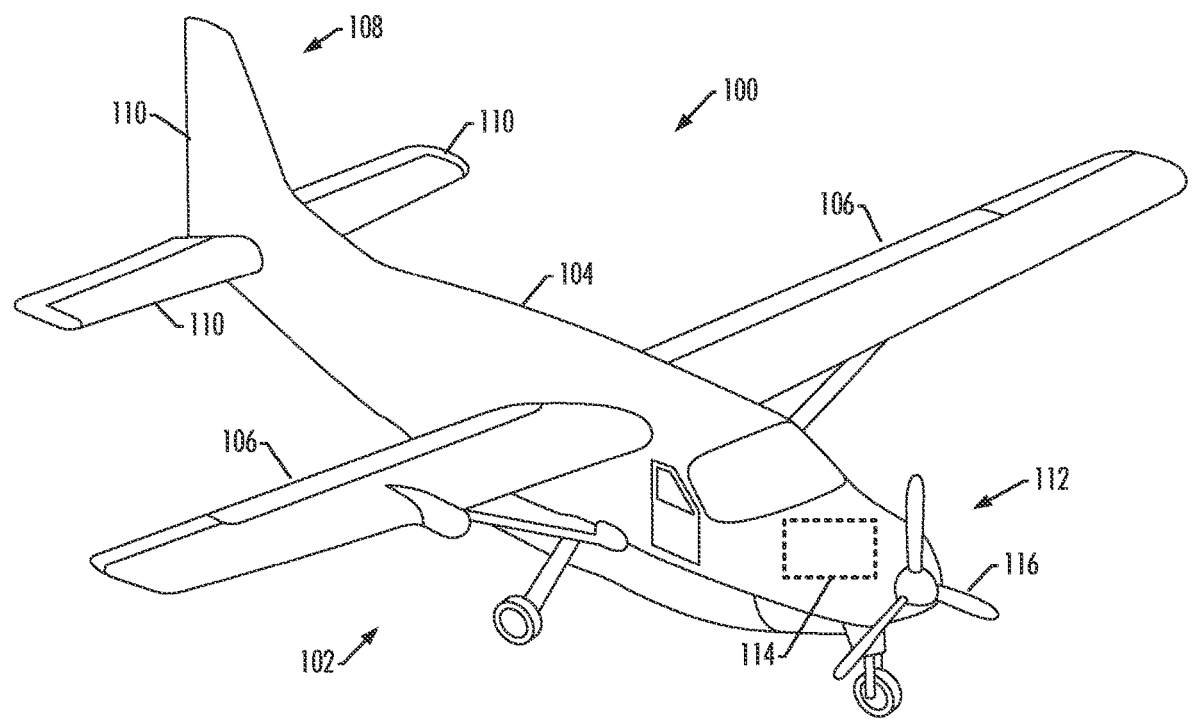
FIG. 1 illustrates one type of robot, or more particularly an aircraft, that may benefit from example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot, an aerial vehicle, an aircraft or the like. A robot designed and configurable to operate with at least some level of autonomy may at times be referred to as an autonomous robot, or an autonomous aerial robot, autonomous aerial vehicle or autonomous aircraft in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

FIG. 1 illustrates one type of robot, or more particularly an aircraft 100, that may benefit from example implementations of the present disclosure. As shown, the aircraft generally includes a basic structure 102 with an airframe including a fuselage 104, and one or more pairs of wings 106 that extend from opposing sides of the fuselage. The airframe also includes an empennage or tail assembly 108 at a rear end of the fuselage, and the tail assembly includes stabilizers 110. The aircraft further includes a propulsion system 112 with an engine 114 configured to power a propulsor 116 to generate propulsive forces that cause the aircraft to move. On the aircraft as shown, the propulsor is a propeller. Depending on the aircraft, in various examples, the propulsors include one or more of rotors, propellers, jet engines or wheels.

Figure 2:
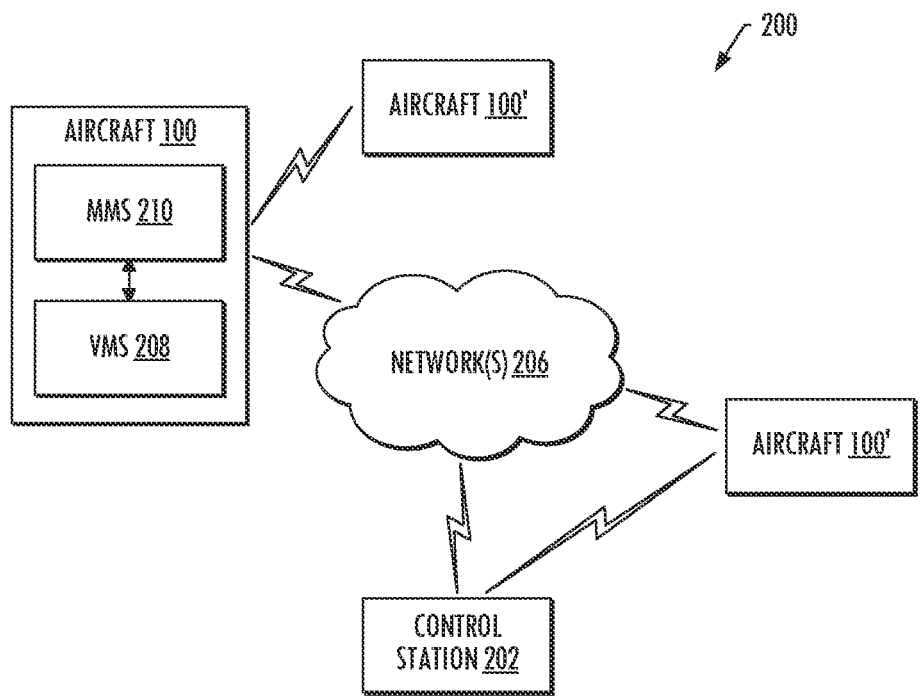
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots such as aircraft 100 and one or more other aircraft 100'. The control station provides facilities for communication with or control of the one or more aircraft, such as by wireless data links directly or across one or more networks 206. In some examples, the control station may be a ground station, and not in all cases control the aircraft. In this regard, the control station may be configured to monitor the aircraft. The control station may initiate mission, but the control station may not control the aircraft to maneuver. At times, then, the control station may enable or provide a distributed network/server of software functions. In yet other examples, the system may not include the control station.

The aircraft 100 includes a vehicle management system (VMS) 208. The VMS is an aircraft-specific subsystem configured to manage subsystems and other components of the aircraft, and the VMS is a particular RMS implementation for a vehicle such as an aircraft. These subsystems and other components include, for example, maneuver controls, landing gear, onboard environmental systems, electrical, pneumatic and hydraulic systems, communications systems, navigation systems and other subsystems and components for controlling operation and maneuvering of the aircraft. The RMS/VMS is configured to accept maneuver commands such as waypoints and/or steering commands, and control the aircraft to follow those maneuver commands.

The aircraft 100 also includes a mission management system (MMS) 210. The MMS is a subsystem configured to manage missions of the aircraft. A mission is a deployment of the aircraft (one or more aircraft) to achieve one or more mission objectives. A mission may be decomposed into maneuvers of the aircraft with optional sensor and/or effector scheduling, and the MMS may execute tasks to manage the aircraft to execute maneuvers with specific parameters and capabilities. The MMS 210 includes subsystems to process sensor data to situational awareness, plan tasks for the aircraft (or multiple aircraft), coordinate with teams to assign tasks, execute assigned tasks. The MMS is also configured to interface with the VMS 208, and in some examples the control station 202. Although the MMS is shown on the aircraft, the MMS may instead be at the control station; or in some examples, the MMS may be distributed between the aircraft and the control station.

According to some example implementations of the present disclosure, the MMS 210 is also configured to provide the aircraft 100 with conflict detection and avoidance capabilities. During a flight, the aircraft may take a path, and this path may be described by a series of waypoints that define a route the aircraft will travel. The aircraft travels with a velocity (speed and direction of motion), and the series of waypoints and velocities at that define the route with respect to time defines a trajectory of the aircraft (at times referred to as a track of the aircraft). The conflict detection and avoidance capabilities enable the aircraft to detect and avoid conflicts along its defined route of travel.

Figure 3:
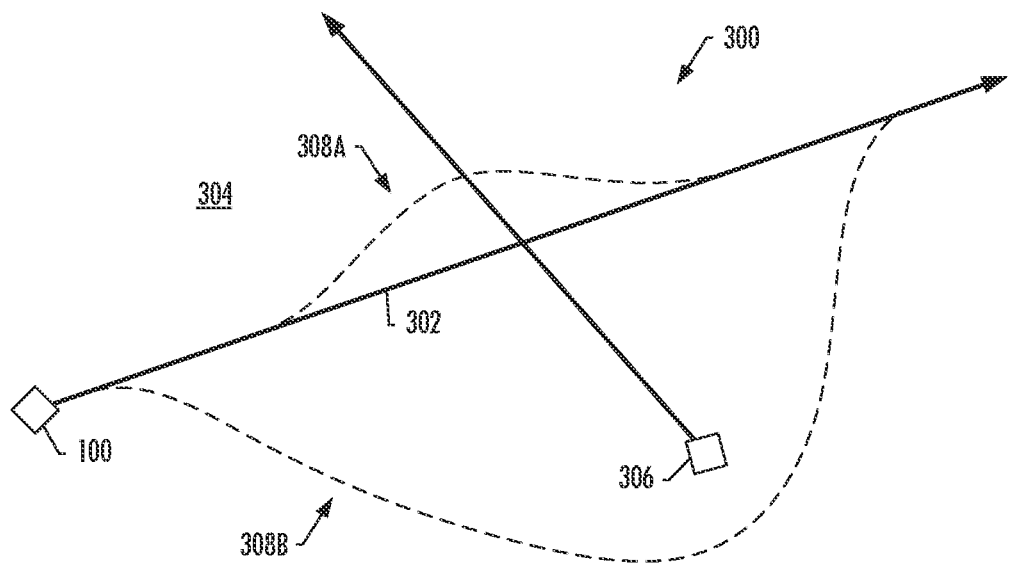
FIG. 3 illustrates a scenario in which the aircraft is on a flight, according to some example implementations.

FIG. 3 illustrates a scenario 300 in which the aircraft 100 on a flight that includes a defined route 302 of travel in an environment 304 in which one or more obstacles 306 are nearby the aircraft. In some examples, these obstacles are other aircraft 100' that may be of the same type or different types than the aircraft. Example implementations of the present disclosure are directed to directed to avoiding a conflict during the flight of the aircraft 100. Some example implementations pose this collision avoidance problem as a two-dimensional (2D) dynamic path-planning problem. As shown in FIG. 3, the goal may be to alternate a collision course of the aircraft, provide a safe distance to the obstacle, and return to the original route when safe.

To improve the run-time efficiency, some example implementations of the present disclosure use a pre-computed collision avoidance policy solved for a surrogate task. The surrogate problem may be designed to be more conservative to guarantee the feasibility of the solution in the true task. The output of example implementations may provide a complete avoidance trajectory as a set of waypoints for the aircraft 100 to follow, which may be visually explainable, and validated before being applied. It is also noteworthy that in some examples, optimality of the solution is not a top priority. In these examples, a quick and feasible avoidance trajectory that satisfies the safety requirements may be provided, rather than an optimal solution at the edge of a safety zone.

According to example implementations of the present disclosure, then, the MMS 210 is configured to receive observations of states of the aircraft 100 and the nearby obstacle 306 in the environment 304 of the aircraft as the aircraft travels the defined route 302. In some examples, the positions may be given as coordinates in a global geographic coordinate system; and the MMS 210 is further configured to convert the coordinates to corresponding coordinates in a local coordinate system.

In some examples, the states of the aircraft 100 and the nearby obstacle 306 are described by at least positions and velocities that are received by the MMS 210. The state of the aircraft may be received from the VMS 208. The state of the nearby obstacle may be indicated by sensor data from any of a number of different sensors including those employing technologies such as acoustics, radio, optics and the like. More particular examples of suitable sensors include those employing radar, lidar, infrared sensors, cameras and the like. Another example of a suitable sensor in the context of an aircraft is an automatic, dependent surveillance-broadcast (ADS-B) receiver configured to receive ADS-B signals.

The MMS 210 is configured to apply the states of the aircraft 100 and the nearby obstacle 306 to a reinforcement learning framework, which may include the positions given as the corresponding coordinates in the local coordinate system. In this regard, the MMS is configured to apply the states to the reinforcement learning framework to predict and thereby determine predicted states of the aircraft to avoid a conflict between the aircraft and the nearby obstacle. The reinforcement learning framework is caused to determine maneuvers of the aircraft to avoid the conflict. The maneuvers may include turns described by at least an acceleration and turning rate. And in some examples, the maneuvers include a first maneuver of the aircraft 100 away from the defined route 302 to avoid the conflict, and a last maneuver of the aircraft back to the defined route when the conflict has been avoided.

According to example implementations of the present disclosure, the reinforcement learning framework is caused to determine the maneuvers of the aircraft 100 using a policy trained using a surrogate model of the environment in which movements of the aircraft and the nearby obstacle are simulated. One example of a suitable policy is one implemented as a fully connected deep neural network. The policy may be trained using the surrogate model in which the aircraft is modeled as less capable at maneuvering than the aircraft is in the environment 304. In some examples, then, the aircraft 100 is modeled in the surrogate model as a dynamic model with parameters that describe operational capabilities including maneuverability of the aircraft in the surrogate model, and at least one of the parameters is limited to a subset of a range that describes maneuverability of the aircraft in the environment 304. The parameter(s) that are limited may include at least one of speed, acceleration or turning rate.

The MMS 210 is configured to determine the predicted states of the aircraft from the maneuvers. In various examples, the predicted states are determined from the maneuvers, and using the surrogate model of the environment 304. In other examples, the predicted states are determined from the maneuvers, and using a transition model that is separate and independent from the surrogate model.

The MMS 210 is configured to generate a collision avoidance trajectory from the predicted states of the aircraft. FIG. 3 illustrates two possible collision avoidance trajectories 308A, 308B that may be generated. In some examples, the predicted states of the aircraft 100 include positions that are given as coordinates in the local coordinate system. In some of these examples, the MMS 210 is further configured to convert the coordinates to corresponding coordinates in a global geographic coordinate system; and the collision avoidance trajectory includes the positions given as the corresponding coordinates in the global geographic coordinate system.

The MMS 210 is configured to output an indication of the collision avoidance trajectory for use in at least one of guidance, navigation or control of the aircraft. This may include the MMS configured to send one or more control commands such as maneuver commands to the VMS 208 to control the aircraft to follow the control commands and thereby the collision avoidance trajectory.

Figure 4:
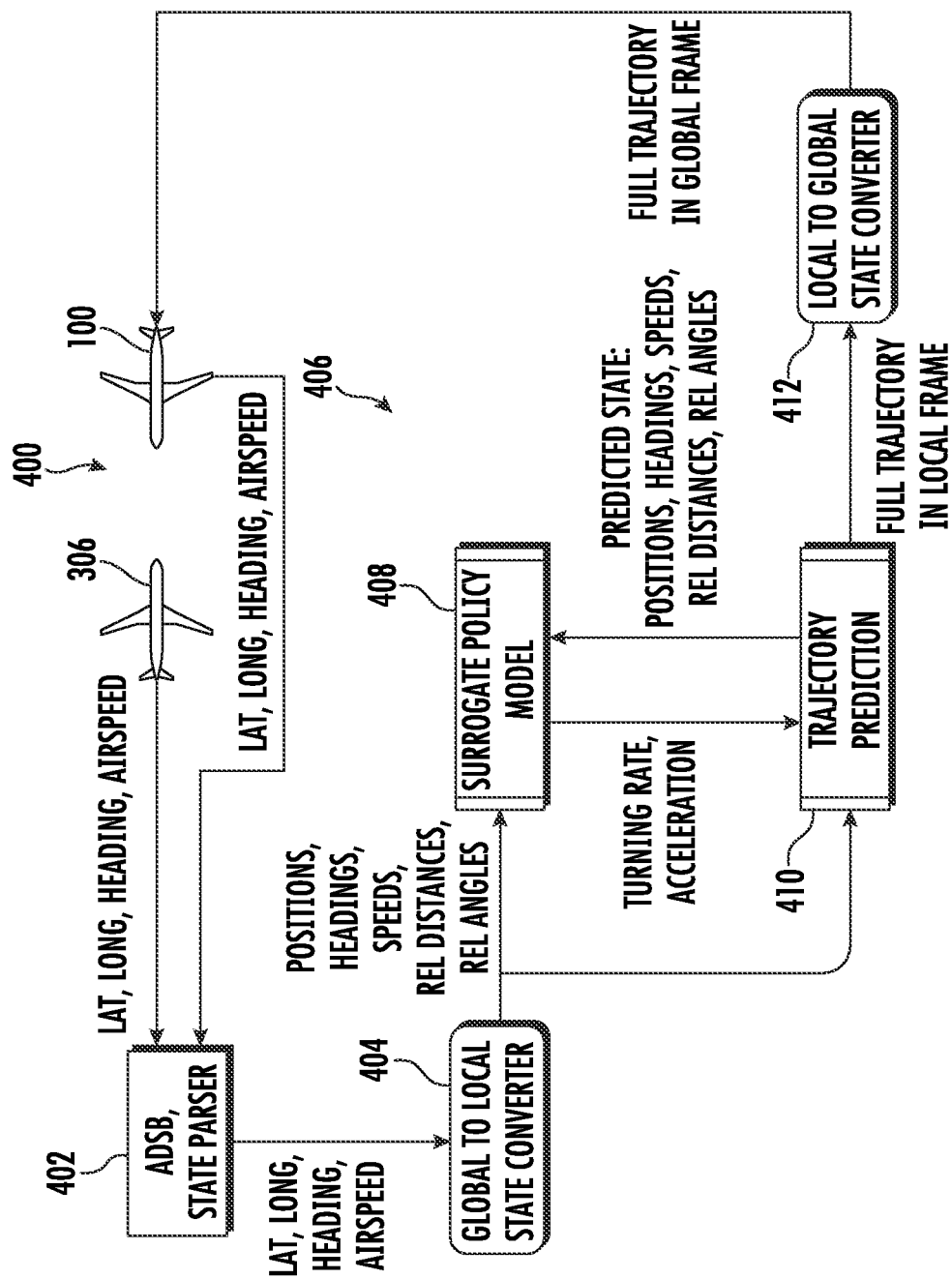
FIG. 4 is a block diagram of a system for avoiding a conflict during a flight of an aircraft, according to some example implementations.

To further illustrate example implementations of the present disclosure, FIG. 4 is a block diagram of a system 400 for avoiding a conflict during a flight of an aircraft 100, which may be implemented by the MMS according to some example implementations. As shown, the system includes an ADS-B state parser 402 configured to parse ADS-B position reports to obtain receive observations of states of the aircraft and nearby obstacle 306 (shown as another aircraft such as aircraft 100'), which may be described by at least positions (latitude, longitude) and velocities (heading, airspeed). The observations may be given in a global geographic coordinate system, and a converter 404 may convert the states to corresponding states in a local coordinate system.

The states may be applied to a reinforcement learning (RL) framework 406 that determines maneuvers of the aircraft 100 to avoid a conflict with the nearby obstacle 306, using a policy 408 (labeled as a "surrogate policy model") trained using a surrogate model of the environment in which movements of the aircraft and the nearby obstacle are simulated. In this regard, the RL framework may be a sequential policy optimization framework that requires continuous data-rich interaction with an environment.

To provide a particular number of interactions, the policy 408 may be trained on a surrogate task in a surrogate model of the environment (at times referred to as a surrogate environment), rather than on the original task. In the surrogate environment, movements of the aircraft 100 (at times referred to as the "agent") and nearby obstacle 306 (at times referred to as the "intruder") may be simulated. The surrogate environment may minimize the risk of collision by providing continuous control commands in the surrogate environment, and these commands may be translated into a geometric trajectory using the surrogate environment. The surrogate environment may be implemented in a number of different manners, such as by a lightweight Python environment integrated with OpenAI GYM framework.

The policy 408 trained using the surrogate model may be a data-driven end-to-end RL policy $\hat{\pi}$ for the surrogate task that shares similar transition dynamics $\hat{T}$ and rules of engagement $\hat{R}$.

$$\pi_{True} = \pi(R_{True}, T_{True}) \qquad (1)$$

$$\hat{\pi} = \pi^*(\hat{R}, \hat{T}) \qquad (2)$$

$$\pi_{True} \approx \hat{\pi}, \text{if } [R_{True}, T_{True}] \in [\hat{R}+\epsilon, \hat{T}+\epsilon] \qquad (3)$$

The policy 408 may then be applied to the original task assuming similarity of transitions and conditions, although the surrogate may be a more conservative approximation of the true task that guarantees the solution will be feasible in the real system. In this regard, the RL framework 406 determines predicted states of the aircraft from the maneuvers, and a trajectory prediction 410 generates a collision avoidance trajectory from the predicted states of the aircraft. The collision avoidance trajectory may be given in the local coordinate system, and a second converter 412 may convert the trajectory to the global geographic coordinate system. The collision avoidance trajectory may then be used in at least one of guidance, navigation or control of the aircraft.

In some examples, the surrogate environment is a simplified 2D collision avoidance problem that mimics the real task (the mid-air collision avoidance). The surrogate environment may simulate movements of the agent (aircraft 100) and intruder (nearby obstacle 306) in an environment of a particular size (e.g., 20×20 kilometers square). The agent has to go around the intruder, provide minimal horizontal separation, and merge back to the next safe waypoint from the original route before the simulation ends.

The surrogate in some examples provides sparse reward feedback for interactions of the agent as shown in Table I.

TABLE I

| Condition | Reward |
| --- | --- |
| Collision or distance violation | −100 |
| No collision, missing the original path | −10 |
| No collision, returning to the original path | 100 |

The surrogate dynamics imitate the dynamics of the aircraft 100, which may be different from 2D car-like dynamics, as the aircraft in the air may not have conventional brakes, acceleration, and steering. The effectiveness of the controls may depend on the aircraft's altitude, airspeed, etc. The parameters selected for turning rates and longitudinal accelerations may be conservative and guaranteed across the full flying envelop of the aircraft.

Selected longitudinal accelerations may allow slight deviations in the aircraft's altitude within a desired flight level. The turning rates may be selected to guarantee the aircraft will be capable of performing the required turning radius. Table II outlines differences that may be used between the main dynamic parameters of the simulated aircraft.

TABLE II

| Parameter | Surrogate | Aircraft (True) | Units |
|---|---|---|---|
| X | −10,000 . . . 10,000 | . . . | m |
| Y | −10,000 . . . 10,000 | . . . | m |
| Heading | −180 . . . 180 | −180 . . . 180 | deg |
| Airspeed | 50 . . . 100 | 31 . . . 100 | m/s |
| Long. acceleration | −0.5 . . . 0.5 | −0.8 . . . 0.5 | m/s$^2$ |
| Yaw Rate | −3 . . . 3 | −5 . . . 5 | deg/s |

In some examples, observation and control values are normalized to [−1 . . . 1]. Repacked observations consumed by the agent may include the following kinematic states of the system or their derivatives (including relative difference, absolute difference, products, etc.):

TABLE III

| Heading | Intruder Heading |
|---|---|
| Airspeed | Intruder Airspeed |
| Distance to Goal | Distance to Intruder |
| Tracking Angle to Goal | Tracking Angle to Intruder |

A simulation update step function may trigger behavior of the agent and intruder, which may be represented by a simplistic dynamic model such as a Dubin's vehicle model for turn dynamics, and a massless kinematics model. The agent and intruder may use a base class that takes control inputs in the form of steering and acceleration commands in return for its updated position and speed. The agent and intruder may perform a turn according to the commanded steering and its minimum turning radius. Also, to facilitate the simulation, a simplified PID-based waypoint controller may be used for the intruder.

A training wrapper may allow overriding certain environment methods and parameters, and introducing certain changes to the environment that may make the policy training more efficient. This wrapper may include scoring, initialization (the agent and intruder have high chance of collision), and repacked and normalized observations. To make sure the agent generalizes the problem, the observations may be rewrapped, with a focus on relative positions rather than absolute. In addition, as indicated above, the values may be normalized to [−1 . . . 1]. Repacked observations consumed by the agent may include the following kinematic states of the system or their derivatives (including relative difference, absolute difference, products, etc.):

| Heading | Intruder heading |
|---|---|
| Airspeed | Intruder airspeed |
| Distance to goal | Distance to intruder |
| Tracking angle to goal | Tracking angle to intruder |

To better cover the configuration space, the initialization routine may be modified. The initial positions may be sampled from an imaginary circle with both the agent and intruder moving towards the center of the circle, which may guarantee that their paths intersect and the agent and intruder are synchronized. As the result, the agent and intruder have a higher chance of collision.

Figure 5:
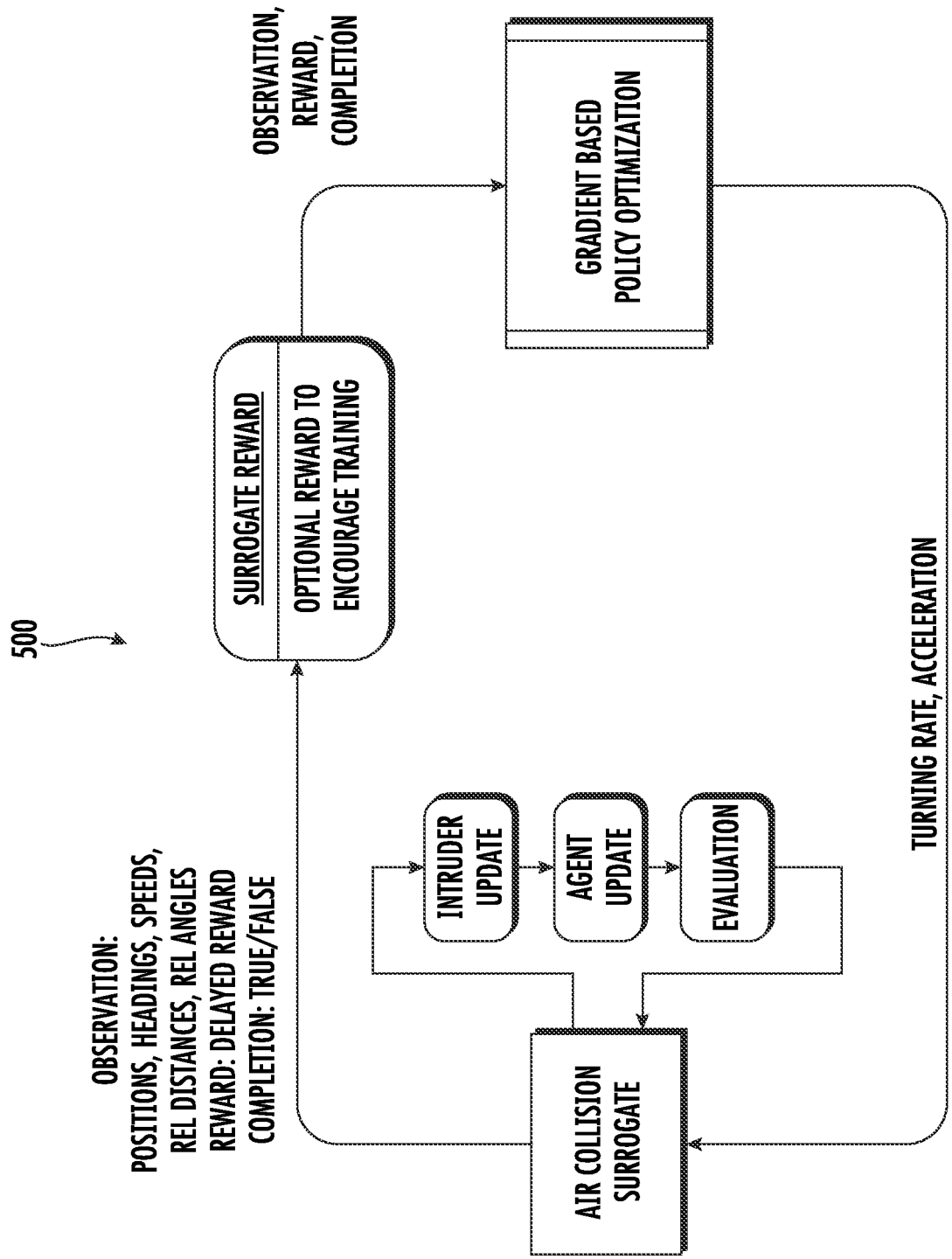
FIG. 5 illustrates a functional block diagram of a reinforcement learning (RL) framework, according to some example implementations.
Figure 6:
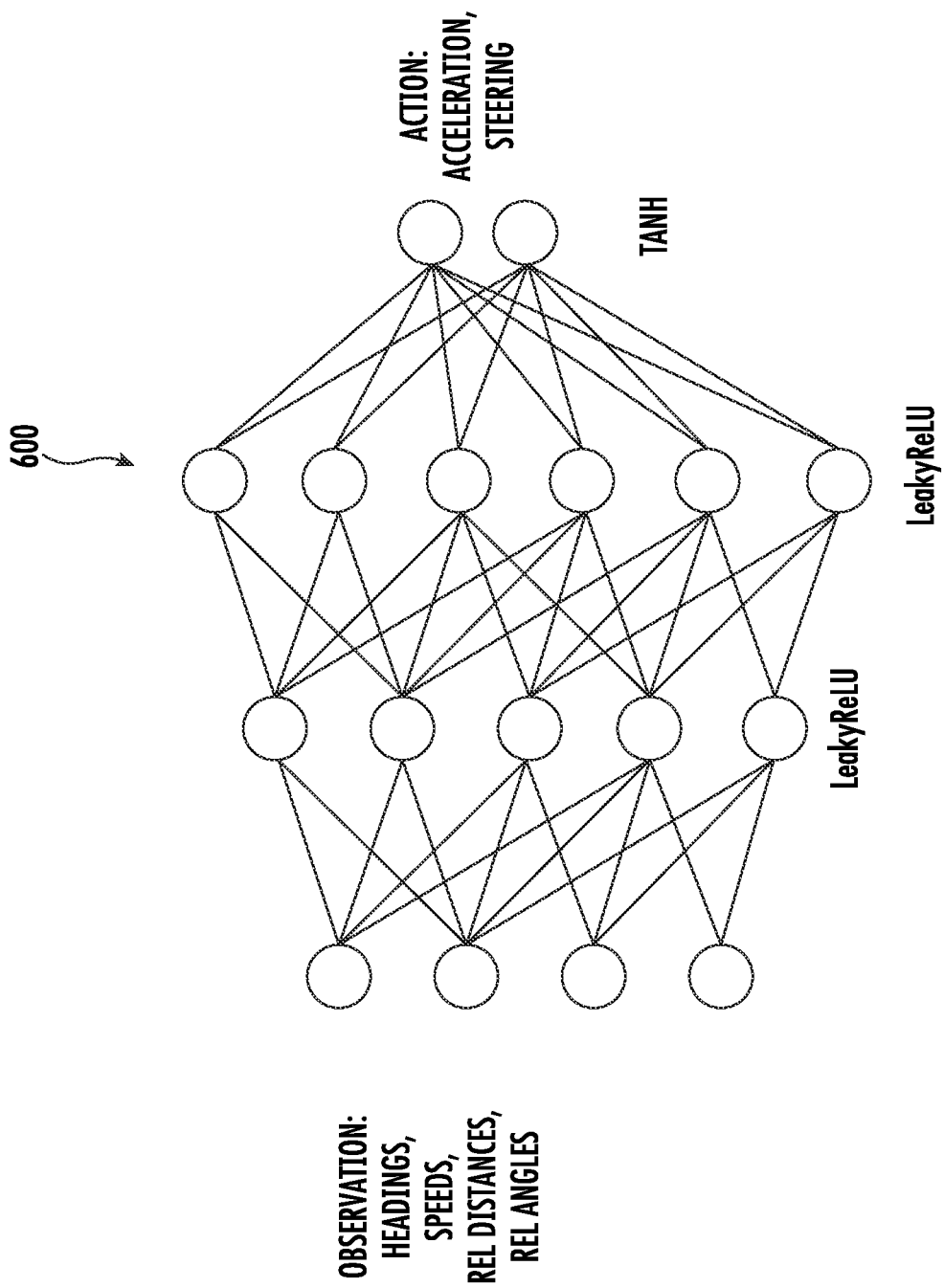
FIG. 6 illustrates a fully connected deep neural network to approximate a policy, according to some example implementations.

The RL framework 406 may learn the task by interacting with the simulation and iteratively updating parameters of the policy 408 using Stochastic Gradient Descent (SGD) optimization. FIG. 5 illustrates a functional block diagram of a RL framework 500 that in some examples may correspond to the RL framework 406. As shown, the RL framework 600 may be used to optimize the policy by iteratively sampling and improving actions of the agent and intruder. And as shown in FIG. 6, in some examples, the policy may be approximated with a fully connected deep neural network 600.

To solve the optimization problem as a Markov Decision Problem (MDP) system, the problem may be refactored into Markovian states s, transitions T(ś|s, α), and transition rewards R(ś|s, α). The state of the system (including both the agent and intruder) may be fully observable, assume the perfect knowledge, and be enough to describe the Markovian state of the MDP system. The state of the agent may be described as $$s = \{v_\alpha, \psi_\alpha, v_i, \psi_i, \beta_i, d_i, \beta_g, d_g\}$$

where $v_\alpha$ is the agent speed, $\psi_\alpha$ is the agent heading, $v_i$ is the intruder speed, $\psi_i$ is the intruder heading, $\beta_i$ is the angle to intruder, $d_i$ is the distance to intruder, $\beta_g$ is the angle to goal, and $d_g$ is the distance to goal.

The optimization may be set to find an optimal policy π*(s) as a set of state-action mappings that maximizes an expected reward V(s).

$$\pi(s) = P(a | s) \qquad (4)$$

$$\pi^*(s) = \operatorname*{argmax}_\pi V^\pi(s) \qquad (5)$$

$$= \operatorname*{argmax}_a (R(s, a) + \gamma T(s' | s, a) V(s')) \qquad (6)$$

The value of the state may be the expected future reward accumulated over the trajectory, and defined by Bellman function as:

$$V(s) = \mathbb{E}[R | s, \pi] \qquad (7)$$

$$= \sum_{s'} T(s' | s, a)(R(s' | s, a) + \gamma(V(s'))) \qquad (8)$$

$$= R(s' | s, a) + \gamma \sum_{s'} T(s' | s, a) V^\pi(s') \qquad (9)$$

$$V^*(s) = \max_a \left( R(s' | s, a) + \gamma \sum_{s'} T(s' | s, a) V^*(s') \right) \qquad (10)$$

The policy 408 may be based on the Actor-Critic architecture that helps to improve the stability of the training. The SGD-based update for actor θ and critic w networks:

$$\delta = R_{t+1} + \gamma \hat{V}(s_{t+1}, w) - \hat{V}(s_t, w) \qquad (11)$$

$$w \leftarrow w + \alpha \delta \nabla \hat{V}(s, w) \qquad (12)$$

$$\theta \leftarrow \theta + \alpha \delta \nabla \ln \pi(\alpha | s, \theta) \qquad (13)$$

The core functionality of the RL framework 406 may incorporate the Stable Baselines library, a very reputable fork of OpenAI Baselines. For the exploration policy and update steps, the Proximal Policy Optimization (PPO) algorithm may be used.

Figure 7A:
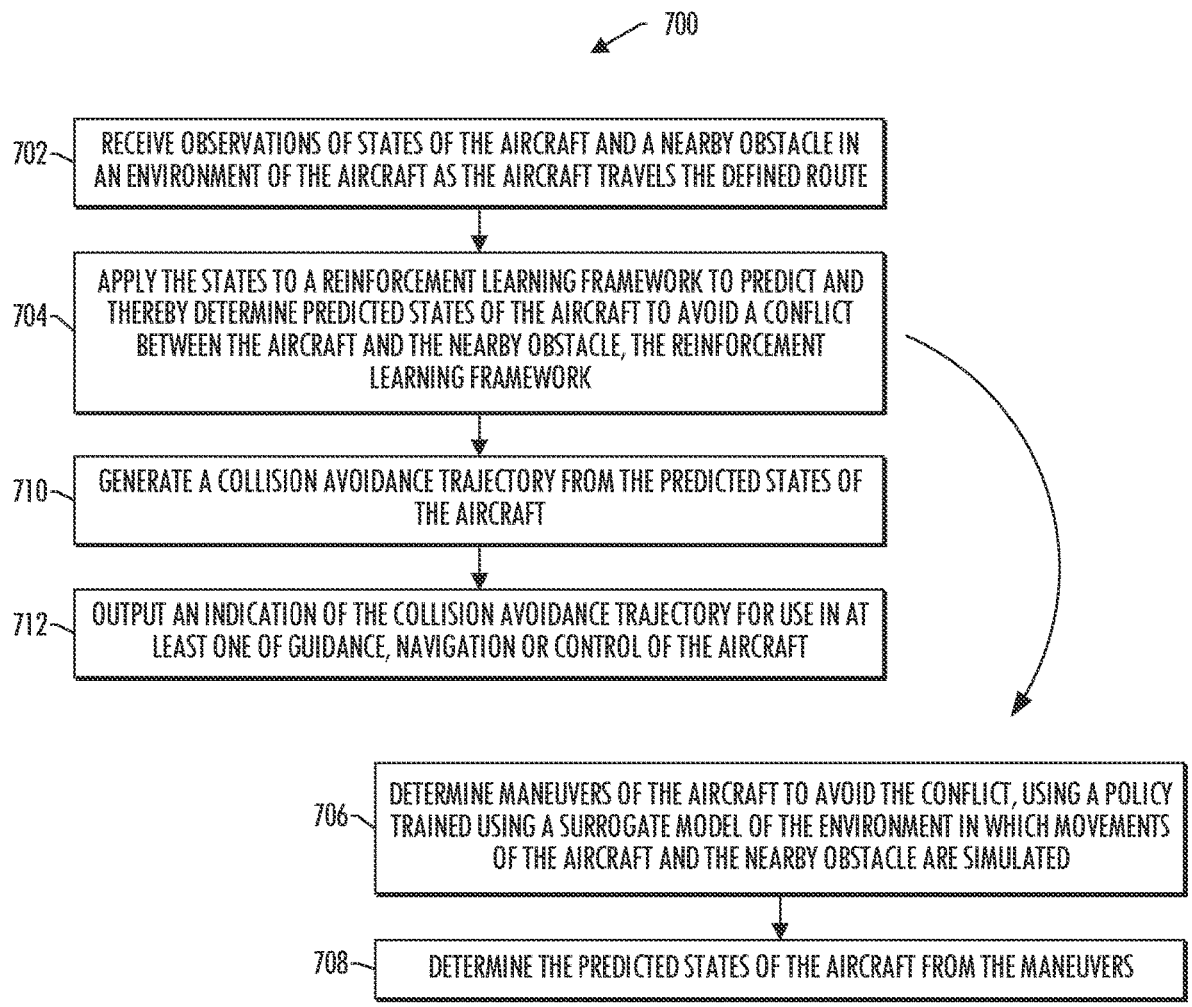

FIGS. 7A-7C are flowcharts illustrating various steps in a method 700 of avoiding a conflict during a flight of an aircraft that includes a defined route of travel, according to various example implementations of the present disclosure.

The method includes receiving observations of states of the aircraft and a nearby obstacle in an environment of the aircraft as the aircraft travels the defined route, as shown at block 702 of FIG. 7A. The method includes applying at block 704 the states to a reinforcement learning framework to predict and thereby determine predicted states of the aircraft to avoid a conflict between the aircraft and the nearby obstacle. The reinforcement learning framework determines maneuvers of the aircraft to avoid the conflict, using a policy trained using a surrogate model of the environment in which movements of the aircraft and the nearby obstacle are simulated, and determines the predicted states of the aircraft from the maneuvers, as shown at blocks 706 and 708. The method includes generating a collision avoidance trajectory from the predicted states of the aircraft, as shown at block 710. And the method includes outputting an indication of the collision avoidance trajectory for use in at least one of guidance, navigation or control of the aircraft, as shown at block 712.

In some examples, the states of the aircraft and the nearby obstacle are described by at least positions and velocities.

In some examples, the states of the aircraft and the nearby obstacle include positions that are given as coordinates in a global geographic coordinate system. In some of these examples, the method 700 further includes converting the coordinates to corresponding coordinates in a local coordinate system, as shown at block 714 of FIG. 7B. The states, then, are applied at block 704 to the reinforcement learning framework with the positions given as the corresponding coordinates in the local coordinate system.

In some examples, the predicted states of the aircraft include positions that are given as coordinates in a local coordinate system. In some of these examples, the method 700 further includes converting the coordinates to corresponding coordinates in a global geographic coordinate system, as shown at block 716 of FIG. 7C. And the collision avoidance trajectory includes the positions given as the corresponding coordinates in the global geographic coordinate system.

In some examples, the maneuvers that are determined at block 706 include a first maneuver of the aircraft away from the defined route to avoid the conflict, and a last maneuver of the aircraft back to the defined route when the conflict has been avoided.

In some examples, the maneuvers of the aircraft include turns described by at least an acceleration and turning rate.

In some examples, the maneuvers of the aircraft are determined at block 706 using the policy trained using the surrogate model in which the aircraft is modeled as less capable at maneuvering than the aircraft is in the environment.

In some examples, the aircraft is modeled in the surrogate model as a dynamic model with parameters that describe operational capabilities including maneuverability of the aircraft in the surrogate model, and at least one of the parameters is limited to a subset of a range that describes maneuverability of the aircraft in the environment.

In some examples, the at least one of the parameters include at least one of speed, acceleration or turning rate.

In some examples, the maneuvers of the aircraft are determined at block 706 using the policy that is implemented as a fully connected deep neural network.

In some examples, the predicted states are determined at block 708 from the maneuvers, and using the surrogate model of the environment.

In some examples, the predicted states are determined at block 708 from the maneuvers, and using a transition model that is separate and independent from the surrogate model.

According to example implementations of the present disclosure, the VMS 208 and the MMS 210 may be implemented by various means. Means for implementing the VMS and MMS may include hardware, alone or under direction of one or more computer programs from a computer-readable storage medium. In some examples, one or more apparatuses may be configured to function as or otherwise implement the VMS and MMS shown and described herein. In examples involving more than one apparatus, the respective apparatuses may be connected to or otherwise in communication with one another in a number of different manners, such as directly or indirectly via a wired or wireless network or the like.

Figure 8:
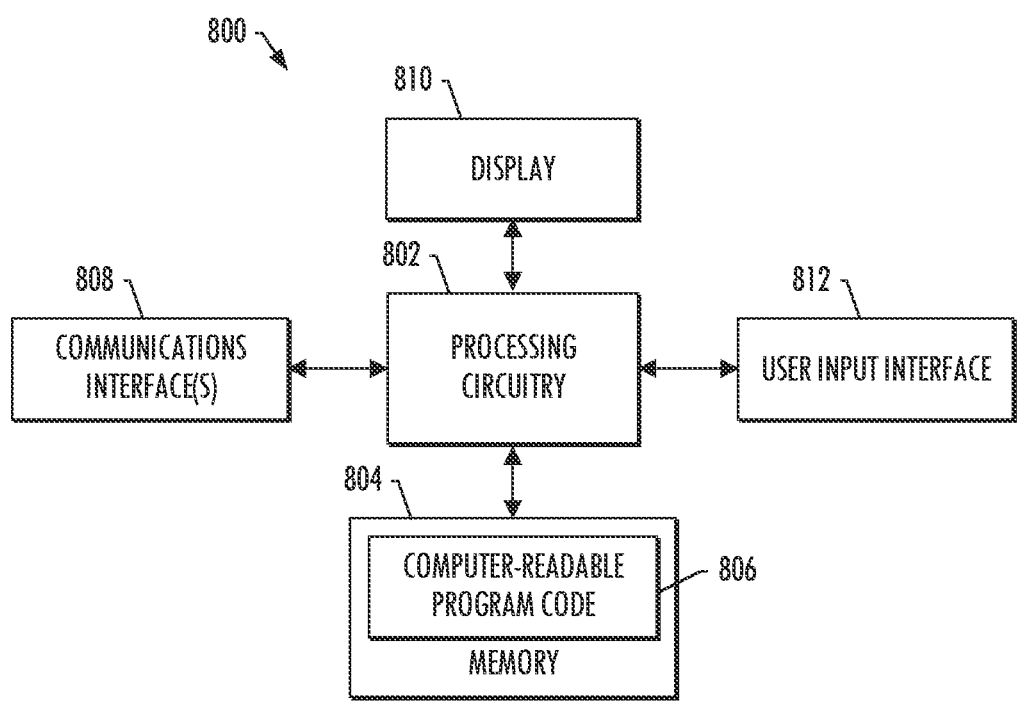
FIG. 8 illustrates an apparatus according to some example implementations.

FIG. 8 illustrates an apparatus 800 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 802 (e.g., processor unit) connected to a memory 804 (e.g., storage device).

The processing circuitry 802 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 804 (of the same or another apparatus).

The processing circuitry 802 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 804 is generally any piece of computer hardware that is capable of storing information such as, for example, data, computer programs (e.g., computer-readable program code 806) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 804, the processing circuitry 802 may also be connected to one or more interfaces for displaying, transmitting and/or receiving information. The interfaces may include a communications interface 808 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 810 and/or one or more user input interfaces 812 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 800 may include a processing circuitry 802 and a computer-readable storage medium or memory 804 coupled to the processing circuitry, where the processing circuitry is configured to execute computer-readable program code 806 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for avoiding a conflict during a flight of an aircraft that includes a defined route of travel, the apparatus comprising: a memory configured to store computer-readable program code; and processing circuitry configured to access the memory, and execute the computer-readable program code to cause the apparatus to at least: receive observations of states of the aircraft and a nearby obstacle in an environment of the aircraft as the aircraft travels the defined route; apply the states to a reinforcement learning framework to predict and thereby determine predicted states of the aircraft to avoid a conflict between the aircraft and the nearby obstacle, the reinforcement learning framework caused to: determine maneuvers of the aircraft to avoid the conflict, using a policy trained using a surrogate model of the environment in which movements of the aircraft and the nearby obstacle are simulated; and determine the predicted states of the aircraft from the maneuvers; generate a collision avoidance trajectory from the predicted states of the aircraft; and output an indication of the collision avoidance trajectory for use in at least one of guidance, navigation or control of the aircraft.

Clause 2. The apparatus of clause 1, wherein the states of the aircraft and the nearby obstacle are described by at least positions and velocities.

Clause 3. The apparatus of clause 1 or clause 2, wherein the states of the aircraft and the nearby obstacle include positions that are given as coordinates in a global geographic coordinate system, and the processing circuitry is configured to execute the computer-readable program code to cause the apparatus to further convert the coordinates to corresponding coordinates in a local coordinate system, and wherein the states are applied to the reinforcement learning framework with the positions given as the corresponding coordinates in the local coordinate system.

Clause 4. The apparatus of any of clauses 1 to 3, wherein the predicted states of the aircraft include positions that are given as coordinates in a local coordinate system, and the processing circuitry is configured to execute the computer-readable program code to cause the apparatus to further convert the coordinates to corresponding coordinates in a global geographic coordinate system, and wherein the collision avoidance trajectory includes the positions given as the corresponding coordinates in the global geographic coordinate system.

Clause 5. The apparatus of any of clauses 1 to 4, wherein the maneuvers that are determined include a first maneuver of the aircraft away from the defined route to avoid the conflict, and a last maneuver of the aircraft back to the defined route when the conflict has been avoided.

Clause 6. The apparatus of any of clauses 1 to 5, wherein the maneuvers of the aircraft include turns described by at least an acceleration and turning rate.

Clause 7. The apparatus of any of clauses 1 to 6, wherein the maneuvers of the aircraft are determined using the policy trained using the surrogate model in which the aircraft is modeled as less capable at maneuvering than the aircraft is in the environment.

Clause 8. The apparatus of clause 7, wherein the aircraft is modeled in the surrogate model as a dynamic model with parameters that describe operational capabilities including maneuverability of the aircraft in the surrogate model, and at least one of the parameters is limited to a subset of a range that describes maneuverability of the aircraft in the environment.

Clause 9. The apparatus of clause 8, wherein the at least one of the parameters include at least one of speed, acceleration or turning rate.

Clause 10. The apparatus of any of clauses 1 to 9, wherein the maneuvers of the aircraft are determined using the policy that is implemented as a fully connected deep neural network.

Clause 11. The apparatus of any of clauses 1 to 10, wherein the predicted states are determined from the maneuvers, and using the surrogate model of the environment.

Clause 12. The apparatus of any of clauses 1 to 11, wherein the predicted states are determined from the maneuvers, and using a transition model that is separate and independent from the surrogate model.

Clause 13. A method of avoiding a conflict during a flight of an aircraft that includes a defined route of travel, the method comprising: receiving observations of states of the aircraft and a nearby obstacle in an environment of the aircraft as the aircraft travels the defined route; applying the states to a reinforcement learning framework to predict and thereby determine predicted states of the aircraft to avoid a conflict between the aircraft and the nearby obstacle, the reinforcement learning framework: determining maneuvers of the aircraft to avoid the conflict, using a policy trained using a surrogate model of the environment in which movements of the aircraft and the nearby obstacle are simulated; and determining the predicted states of the aircraft from the maneuvers; generating a collision avoidance trajectory from the predicted states of the aircraft; and outputting an indication of the collision avoidance trajectory for use in at least one of guidance, navigation or control of the aircraft.

Clause 14. The method of clause 13, wherein the states of the aircraft and the nearby obstacle are described by at least positions and velocities.

Clause 15. The method of clause 13 or clause 14, wherein the states of the aircraft and the nearby obstacle include positions that are given as coordinates in a global geographic coordinate system, and the method further comprises converting the coordinates to corresponding coordinates in a local coordinate system, and wherein the states are applied to the reinforcement learning framework with the positions given as the corresponding coordinates in the local coordinate system.

Clause 16. The method of any of clauses 13 to 15, wherein the predicted states of the aircraft include positions that are given as coordinates in a local coordinate system, and the method further comprises converting the coordinates to corresponding coordinates in a global geographic coordinate system, and wherein the collision avoidance trajectory includes the positions given as the corresponding coordinates in the global geographic coordinate system.

Clause 17. The method of any of clauses 13 to 16, wherein the maneuvers that are determined include a first maneuver of the aircraft away from the defined route to avoid the conflict, and a last maneuver of the aircraft back to the defined route when the conflict has been avoided.

Clause 18. The method of any of clauses 13 to 17, wherein the maneuvers of the aircraft include turns described by at least an acceleration and turning rate.

Clause 19. The method of any of clauses 13 to 18, wherein the maneuvers of the aircraft are determined using the policy trained using the surrogate model in which the aircraft is modeled as less capable at maneuvering than the aircraft is in the environment.

Clause 20. The method of clause 19, wherein the aircraft is modeled in the surrogate model as a dynamic model with parameters that describe operational capabilities including maneuverability of the aircraft in the surrogate model, and at least one of the parameters is limited to a subset of a range that describes maneuverability of the aircraft in the environment.

Clause 21. The method of clause 20, wherein the at least one of the parameters include at least one of speed, acceleration or turning rate.

Clause 22. The method of any of clauses 13 to 21, wherein the maneuvers of the aircraft are determined using the policy that is implemented as a fully connected deep neural network.

Clause 23. The method of any of clauses 13 to 22, wherein the predicted states are determined from the maneuvers, and using the surrogate model of the environment.

Clause 24. The method of any of clauses 13 to 23, wherein the predicted states are determined from the maneuvers, and using a transition model that is separate and independent from the surrogate model.

Clause 25. A computer-readable storage medium for avoiding a conflict during a flight of an aircraft that includes a defined route of travel, the computer-readable storage medium being non-transitory and having computer-readable program code stored therein that, in response to execution by processing circuitry, causes an apparatus to at least: receive observations of states of the aircraft and a nearby obstacle in an environment of the aircraft as the aircraft travels the defined route; apply the states to a reinforcement learning framework to predict and thereby determine predicted states of the aircraft to avoid a conflict between the aircraft and the nearby obstacle, the reinforcement learning framework caused to: determine maneuvers of the aircraft to avoid the conflict, using a policy trained using a surrogate model of the environment in which movements of the aircraft and the nearby obstacle are simulated; and determine the predicted states of the aircraft from the maneuvers; generate a collision avoidance trajectory from the predicted states of the aircraft; and output an indication of the collision avoidance trajectory for use in at least one of guidance, navigation or control of the aircraft.

Clause 26. The computer-readable storage medium of clause 25, wherein the states of the aircraft and the nearby obstacle are described by at least positions and velocities.

Clause 27. The computer-readable storage medium of clause 25 or clause 26, wherein the states of the aircraft and the nearby obstacle include positions that are given as coordinates in a global geographic coordinate system, and the computer-readable storage medium has further computer-readable program code stored therein that, in response to execution by the processing circuitry, causes the apparatus to further convert the coordinates to corresponding coordinates in a local coordinate system, and wherein the states are applied to the reinforcement learning framework with the positions given as the corresponding coordinates in the local coordinate system.

Clause 28. The computer-readable storage medium of any of clauses 25 to 27, wherein the predicted states of the aircraft include positions that are given as coordinates in a local coordinate system, and the computer-readable storage medium has further computer-readable program code stored therein that, in response to execution by the processing circuitry, causes the apparatus to further convert the coordinates to corresponding coordinates in a global geographic coordinate system, and wherein the collision avoidance trajectory includes the positions given as the corresponding coordinates in the global geographic coordinate system.

Clause 29. The computer-readable storage medium of any of clauses 25 to 28, wherein the maneuvers that are determined include a first maneuver of the aircraft away from the defined route to avoid the conflict, and a last maneuver of the aircraft back to the defined route when the conflict has been avoided.

Clause 30. The computer-readable storage medium of any of clauses 25 to 29, wherein the maneuvers of the aircraft include turns described by at least an acceleration and turning rate.

Clause 31. The computer-readable storage medium of any of clauses 25 to 30, wherein the maneuvers of the aircraft are determined using the policy trained using the surrogate model in which the aircraft is modeled as less capable at maneuvering than the aircraft is in the environment.

Clause 32. The computer-readable storage medium of clause 31, wherein the aircraft is modeled in the surrogate model as a dynamic model with parameters that describe operational capabilities including maneuverability of the aircraft in the surrogate model, and at least one of the parameters is limited to a subset of a range that describes maneuverability of the aircraft in the environment.

Clause 33. The computer-readable storage medium of clause 32, wherein the at least one of the parameters include at least one of speed, acceleration or turning rate.

Clause 34. The computer-readable storage medium of any of clauses 25 to 33, wherein the maneuvers of the aircraft are determined using the policy that is implemented as a fully connected deep neural network.

Clause 35. The computer-readable storage medium of any of clauses 25 to 34, wherein the predicted states are determined from the maneuvers, and using the surrogate model of the environment.

Clause 36. The computer-readable storage medium of any of clauses 25 to 35, wherein the predicted states are determined from the maneuvers, and using a transition model that is separate and independent from the surrogate model.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for avoiding a conflict during a flight of an aircraft that includes a defined route of travel, the apparatus comprising:
   a memory configured to store computer-readable program code; and
   processing circuitry configured to access the memory and execute the computer-readable program code to cause the apparatus to at least:
      receive observations of states of the aircraft and an obstacle in an environment of the aircraft as the aircraft travels the defined route;
      apply the states to a sequential policy-optimization framework to predict and thereby determine predicted states of the aircraft to avoid a conflict between the aircraft and the obstacle, wherein the sequential policy-optimization framework is caused to:
         learn a policy-optimization task by iteratively updating parameters of a trial policy using a stochastic gradient-descent optimization,
         determine maneuvers of the aircraft to avoid the conflict, using a policy trained using a surrogate model of the environment in which movements of the aircraft and the obstacle are simulated, wherein initial positions of the aircraft and the obstacle are on an imaginary circle with both the aircraft and the obstacle moving toward a center of the circle, and in which the aircraft goes around the obstacle at a horizontal separation and merges back to a next safe waypoint from an original route, the surrogate model providing a sparse reward feedback for interactions including collision, returning to the original route absent collision, and failing to return to the original route absent collision, and
         determine the predicted states of the aircraft from the maneuvers;
      generate a collision avoidance trajectory from the predicted states of the aircraft; and
      output an indication of the collision avoidance trajectory for use in at least one of guidance, navigation, or control of the aircraft.

2. The apparatus of claim 1, wherein the states of the aircraft and the obstacle include positions that are given as coordinates in a global geographic coordinate system, and the processing circuitry is configured to execute the computer-readable program code to cause the apparatus to further convert the coordinates to corresponding coordinates in a local coordinate system, and wherein the states are applied to the sequential policy-optimization framework with the positions given as the corresponding coordinates in the local coordinate system.

3. The apparatus of claim 1, wherein the predicted states of the aircraft include positions that are given as coordinates in a local coordinate system, and the processing circuitry is configured to execute the computer-readable program code to cause the apparatus to further convert the coordinates to corresponding coordinates in a global geographic coordinate system, and
wherein the collision avoidance trajectory includes the positions given as the corresponding coordinates in the global geographic coordinate system.

4. The apparatus of claim 1, wherein the maneuvers that are determined include a first maneuver of the aircraft away from the defined route to avoid the conflict, and a last maneuver of the aircraft back to the defined route when the conflict has been avoided.

5. The apparatus of claim 1, wherein the maneuvers of the aircraft include turns described by at least an acceleration and turning rate.

6. The apparatus of claim 1, wherein the maneuvers of the aircraft are determined using the policy trained using the surrogate model in which the aircraft is modeled as less capable at maneuvering than the aircraft is in the environment.

7. The apparatus of claim 1, wherein the predicted states are determined from the maneuvers, and using the surrogate model of the environment.

8. A method of avoiding a conflict during a flight of an aircraft that includes a defined route of travel, the method comprising:
receiving observations of states of the aircraft and an obstacle in an environment of the aircraft as the aircraft travels the defined route;
applying the states to a sequential policy-optimization framework to predict and thereby determine predicted states of the aircraft to avoid a conflict between the aircraft and the obstacle, wherein the sequential policy-optimization framework:
learns a policy-optimization task by iteratively updating parameters of a trial policy using a stochastic gradient-descent optimization,
determines maneuvers of the aircraft to avoid the conflict, using a policy trained using a surrogate model of the environment in which movements of the aircraft and the obstacle are simulated, wherein initial positions of the aircraft and the obstacle are on an imaginary circle with both the aircraft and the obstacle moving toward a center of the circle, and in which the aircraft goes around the obstacle at a horizontal separation and merges back to a next safe waypoint from an original route, the surrogate model providing a sparse reward feedback for interactions including collision, returning to the original route absent collision, and failing to return to the original route absent collision, and
determines the predicted states of the aircraft from the maneuvers;
generating a collision avoidance trajectory from the predicted states of the aircraft; and
outputting an indication of the collision avoidance trajectory for use in at least one of guidance, navigation or control of the aircraft.

9. The method of claim 8, wherein the states of the aircraft and the obstacle include positions that are given as coordinates in a global geographic coordinate system, and the method further comprises converting the coordinates to corresponding coordinates in a local coordinate system, and
wherein the states are applied to the sequential policy-optimization framework with the positions given as the corresponding coordinates in the local coordinate system.

10. The method of claim 8, wherein the predicted states of the aircraft include positions that are given as coordinates in a local coordinate system, and the method further comprises converting the coordinates to corresponding coordinates in a global geographic coordinate system, and
wherein the collision avoidance trajectory includes the positions given as the corresponding coordinates in the global geographic coordinate system.

11. The method of claim 8, wherein the maneuvers that are determined include a first maneuver of the aircraft away from the defined route to avoid the conflict, and a last maneuver of the aircraft back to the defined route when the conflict has been avoided.

12. The method of claim 8, wherein the maneuvers of the aircraft include turns described by at least an acceleration and turning rate.

13. The method of claim 8, wherein the maneuvers of the aircraft are determined using the policy trained using the surrogate model in which the aircraft is modeled as less capable at maneuvering than the aircraft is in the environment.

14. The method of claim 13, wherein the aircraft is modeled in the surrogate model as a dynamic model with parameters that describe operational capabilities including maneuverability of the aircraft in the surrogate model, and at least one of the parameters is limited to a subset of a range that describes maneuverability of the aircraft in the environment.

15. The method of claim 8, wherein the maneuvers of the aircraft are determined using the policy that is implemented as a fully connected deep neural network.

16. The method of claim 8, wherein the predicted states are determined from the maneuvers using a transition model that is separate and independent from the surrogate model.

17. The method of claim 8, wherein learning the policy-optimization task comprises learning as a Markov Decision problem comprising Markovian states, transitions, and transition rewards.

18. The method of claim 8, wherein learning the policy-optimization task comprises learning according to an actor-critic model.

19. A computer-readable storage medium for avoiding a conflict during a flight of an aircraft that includes a defined route of travel, the computer-readable storage medium being non-transitory and having computer-readable program code stored therein that, in response to execution by processing circuitry, causes an apparatus to at least:
receive observations of states of the aircraft and an obstacle in an environment of the aircraft as the aircraft travels the defined route;
apply the states to a sequential policy-optimization framework to predict and thereby determine predicted states of the aircraft to avoid a conflict between the aircraft and the obstacle, wherein the sequential policy-optimization framework caused to:
learn a policy-optimization task by iteratively updating parameters of a trial policy using a stochastic gradient-descent optimization,
determine maneuvers of the aircraft to avoid the conflict, using a policy trained using a surrogate model of the environment in which movements of the aircraft and the obstacle are simulated, wherein initial positions of the aircraft and the obstacle are on an imaginary circle with both the aircraft and the obstacle moving toward a center of the circle, and in which the aircraft goes around the obstacle at a horizontal separation and merges back to a next safe waypoint from an original route, and determine the predicted states of the aircraft from the maneuvers;

generate a collision avoidance trajectory from the predicted states of the aircraft; and output an indication of the collision avoidance trajectory for use in at least one of guidance, navigation or control of the aircraft.

20. The computer-readable storage medium of claim 19, wherein the surrogate model provides sparse reward feedback with different rewards for interactions, including:
(a) collision;
(b) returning to the original route absent collision; and
(c) failing to return to the original route absent collision.

* * * * *